Feb. 1, 1955 N. W. FRANKLIN 2,701,080
MATERIAL HANDLING APPARATUS WITH A TOTE
BOX HAVING A REMOVABLE BOTTOM
Filed July 13, 1949 2 Sheets-Sheet 2
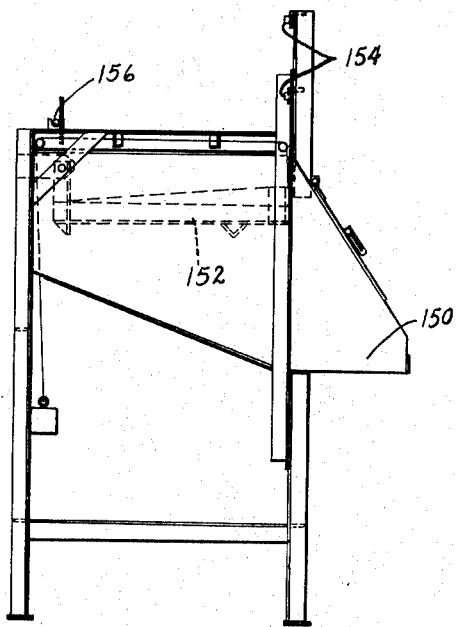
Fig. X
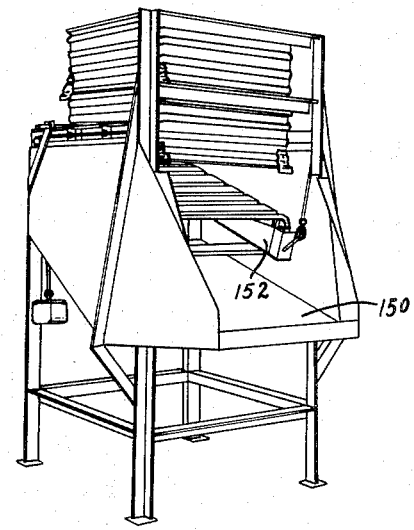
Fig. VIII
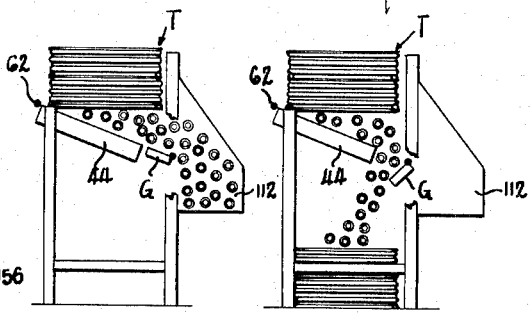
Fig. VI   Fig. VII
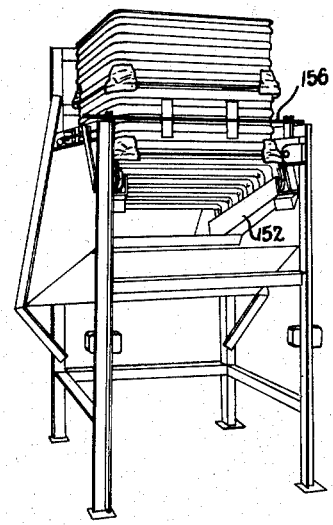
Fig. IX
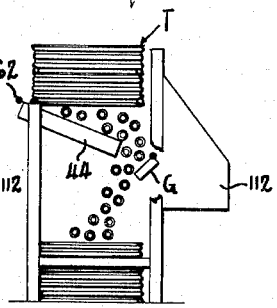
Fig. V
INVENTOR.
NOEL W. FRANKLIN
BY
Faloey, Souther & Stoltenberg

United States Patent Office 2,701,080
Patented Feb. 1, 1955

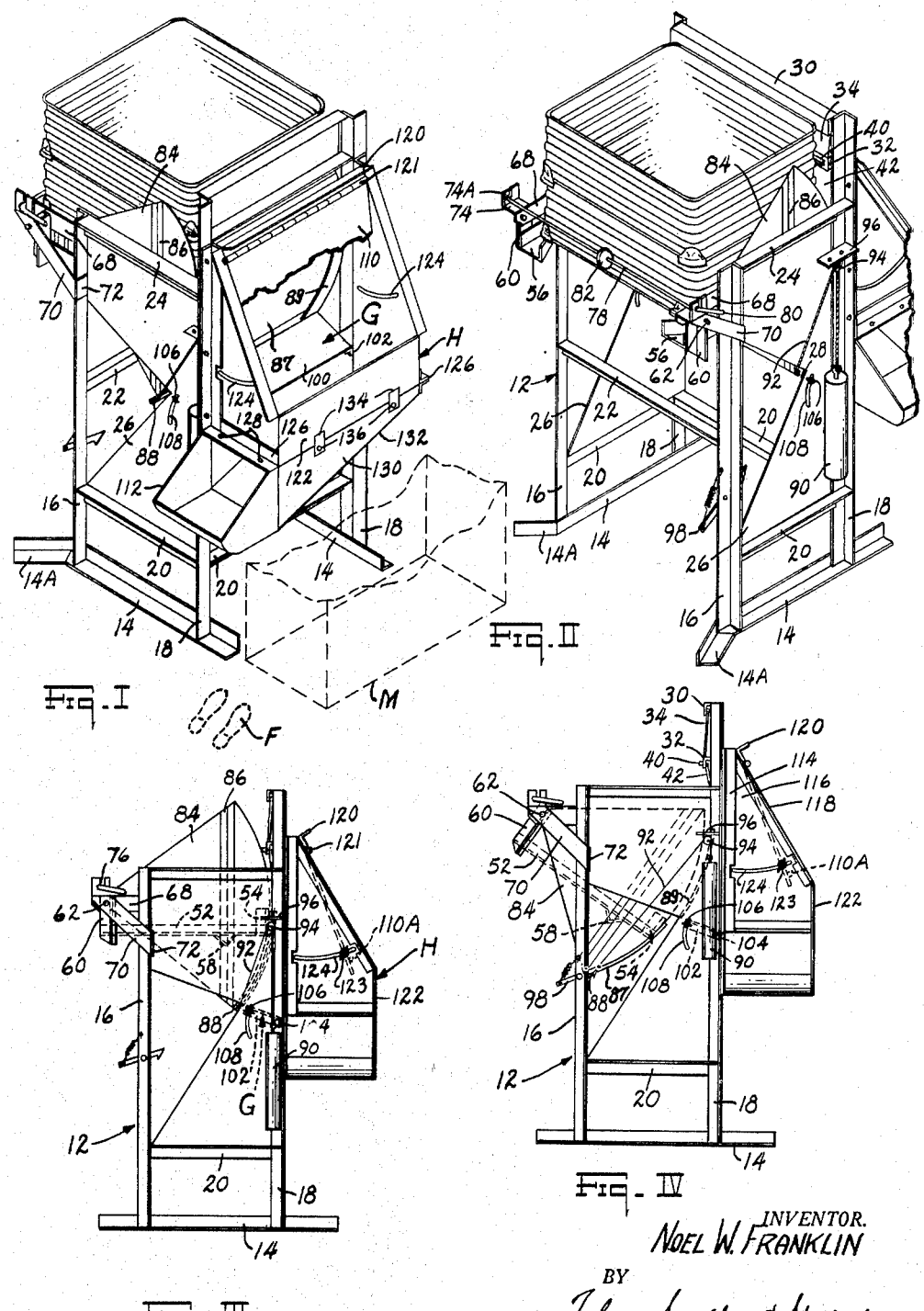

2,701,080

MATERIAL HANDLING APPARATUS WITH A TOTE BOX HAVING A REMOVABLE BOTTOM

Noel W. Franklin, Toledo, Ohio

Application July 13, 1949, Serial No. 104,534

16 Claims. (Cl. 222—185)

This invention relates to material handling apparatus, more particularly to apparatus which facilitates the movement of material, particularly partially fabricated parts from one location to another in a production line to have performed thereon an operation by a machine tool wherein the part is handled by an operator of the machine tool.

In the past, partially fabricated elements or parts were carried from one operational location to another by means of standard toteboxes, which consists of a skid consisting of a platform having depending flanges on two sides to allow the fork of a lift truck to enter thereunder and one or more rings cooperating with the skid as a bottom to form open ended box-like structures of separable parts, commonly called toteboxes. Into these toteboxes, the loose parts were dropped and carried by lift trucks to the desired location where the operator would withdraw them for a second operation on a machine tool, or the parts were removed from the totebox by a shovel or scoop and placed on a work table for the convenience of the operator. This was very uneconomical and often resulted in costs in which the cost of bringing the parts to an operator was equal to the cost of the operation performed on the part by the operator of the machine tool.

The present invention contemplates the provision of a hopper device which utilizes the standard totebox aforementioned in connection therewith to provide a means which will make conveniently available to an operator partially fabricated parts in relatively large quantities, so that further operations can be performed on the part, whereby manufacturing costs may be substantially reduced.

It is a further object of this invention to provide a hopper device utilizing standard toteboxes which can be loaded and unloaded by lift trucks to make partially fabricated parts available to an operator of a machine tool in relatively large quantities at a convenient height to facilitate production.

It is a further object of this invention to provide a hopper device which can be loaded by a lift truck and which can be readily unloaded from the device in the event of an error by utilizing a by-pass gate, so that the parts fall into a container without the use of extensive hand labor.

It is a further object of this invention to provide a material handling device which will facilitate the handling of partially fabricated parts in connection with machine tools, which will increase production by its convenience and adaptability.

It is a further object of this invention to provide a material handling device in connection with machine tools which will substantially reduce the costs of handling partially fabricated parts between machine operations.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a perspective view of a device incorporating the invention from the front side thereof;

Fig. II is a perspective view of the device shown in Fig. I from the rear side;

Fig. III is an elevational view from one side with a part thereof in raised position;

Fig. IV is an elevational view, similar to Fig. III, showing the part in operational position;

Fig. V is an exploded elevational view of a standard totebox;

Fig. VI is a schematic view of an elevation, similar to Fig. IV, showing the operation of the device;

Fig. VII is a schematic view, similar to Fig. VI, showing the unloading operation of the device in the event of an error or the like;

Fig. VIII is a perspective view from the front side of a modification of the invention;

Fig. IX is a perspective view from the rear side of the device shown in Fig. VIII, and;

Fig. X is an elevational view from the left side of the device shown in Fig. VIII.

Referring now to the drawings, particularly to Fig. I, a framework 12 is shown, preferably made of angle irons, with a pair of base members 14 and a pair of upright rearward members 16 and a pair of upright forward members 18 juxtaposed in rectangular relation substantially at the four corners of a square. The base members 14 are provided at their rearward ends with outwardly flaring angular pieces 14A which provide better stability and also act as guide means as will be further described hereinafter.

Adjacent the floor, three horizontally-disposed side angle irons 20 are provided on the sides and the front, with the rear side being also provided with a similar member 22 at substantially a central location a substantial distance above the floor, which provides a clear space on the floor for use to be further described hereinafter. Adjacent the top of the rearward upright members 16, a pair of horizontal side members 24 are provided to form the framework 12 which is made rigid by a pair of side plates 26 which are attached to the adjoining members 16, 18, 20 and 24. The side plates 26 are deeply indented by a triangular cutout from their rearward edge terminating in an angle 28 substantially nearer to the forward upright 18 than the rear upright 16 as shown.

The forward upright members 18 extend a substantial distance above the upper horizontal frame members 24, being provided with a pair of horizontal angles 30 and 32, the first being positioned at the top end of the upright members while the second is spaced below approximately half way between the upper angle 30 and the horizontal frame member 24. If desired, a plate 34 is positioned between the angles 30 and 32, to act as a guide for an operator positioning a totebox assembly T (Fig. V) on the framework as described hereinafter whereby the overhanging upper rim 36 of a ring 38 is guided to hang on a transverse bar 40 welded on the angle 32 (Fig. IV). For this purpose, the plate 34 is welded flush with the face of the angle 32 as shown. Below the angle 32, a depending baffle-plate 42 is provided, welded thereto and adapted to extend below the level of the side member 24.

In the previous paragraph, there has been described a means for holding the totebox assembly by the co-operation between the transverse bar 40 and the rim 36 of the ring 38, which form a part of a totebox assembly T, best seen in Fig. V. A totebox assembly comprises a skid 44 which has a floor 45 and depending flanges 46 and one or more rings 38 adapted to be fitted thereon, and held from horizontal displacement by corner pieces 48 which embrace the corners of the skid. The flanges 46 of the skid hold the floor 45 in a raised position, so that the prongs 50 of a lift truck (not shown) are enabled to enter below the floor and lift the whole assembly and a contained load of loose parts to the desired level, such as for example to enable the rim 36 to cooperate with the transverse bar 40 on the frame-work 12, as already described. This places the totebox assembly with its contained load of loose parts at a level substantially equal to the top of the upright rear members 16, where a means is provided to position the loaded totebox in a manner, so that the loose parts contained therein may be unloaded by gravity to flow into a lower position to be conveniently available to an operator of a machine tool who wishes to perform another operation in the complete fabrication of the part. The structure to hold the totebox assembly in position on the frame-work 12 will now be described.

The runners or depending flanges 46 of the skid 44 of the totebox assembly T are adapted to rest on the webs of a pair of spaced horizontal channels 52, which face upwardly to prevent lateral displacement of the runners. The forward ends of the channels are closed by stop members 54 welded in vertical position therein, and the rear ends are flared at 56 to guide the ingress of the runners therein when placed in operative position by the operator of the lift truck.

The channels are held in spaced relation in the same horizontal plane and in parallel spaced relation with the side members 24 by transverse angle iron 58, welded thereto near the stop members 54, as shown in phantom in Figs. III and IV. At their rear flared ends 56 of the channels, a short vertical angle 60 is welded to each channel, the upper ends of which are pivoted on pins 62, which are held in fixed relation on spaced apertures in a pair of spaced plates 68 and 70 which are welded in angular relation to the sides of the rear uprights 16, the angular plate 70 being provided with a foot 72 for convenient welding, while the horizontal plate 68 is welded directly to the inner side of the upright members 16. The upper ends of the angular plates 70 are cut off horizontally in the plane of the upper side of the horizontal plate 68 and a short piece of angle iron 74 is welded thereto having one portion 74A extending upwardly flush with the outer face of the angular plate 70. The inner end of the iron 74 is welded to the upper side of the plate 68 so as to hold the plates 68 and 70 in fixed parallel relation as shown.

The upwardly extending portions 74A of the short pieces of angle iron 74 are provided with bayonet slots 76 opening upwardly and having their locking bay located rearwardly. A transverse shaft 78 is adapted to seat in the two bayonet slots 76, having at one end an angularly-bent portion 80 for manual manipulation to rotate a centrally located cam wheel 82 affixed to the shaft and adapted to rotate therewith. Referring to Fig. II, it is to be noted that the cam wheel 82, upon rotation, contacts the rear side 38 of the lower ring of a totebox T positioned on the frame-work 12 by having the runners 46 of its skid 44 located in the channels 52, whereby, upon manual manipulation of the bent portion 80 of the shaft 78, the totebox T may be urged forwardly by the cam wheel 82 and forced against the transverse angle irons 30 and 32 on the upper end of the forward frame members 18. This establishes a holding relation between the transverse bar 40 and the rim 36 of the lower ring of the totebox T, which prevents the ring from being displaced downwardly even though the skid 44 is moved downwardly from its cooperative relation with the ring about the pivot pins 62 as will be further described hereinafter.

On the outer side of the channels 52, a pair of sector plates 84 are provided, being welded to the channels, so that the arcuate portions thereof center substantially in the pivot pins 62. For greater strength, a pair of angle irons 86 are welded, one to each plate 84, having the apex of the angle positioned outwardly and located as a chord across to arcuate portion of the plate substantially as shown. A transverse arcuate plate 87 is welded to the forward edges of the sector plates 84 below the level of the channels 52. At the lower ends of the arcuate portions, a transverse bar 88 is provided having portions extending outwardly beyond the sector plates 84 into the cutout portion of the side plates 26, where the bar 88 cooperates with the apex 28 to form a stop to limit the upward movement of the whole assembly pivoted about the pins 62, which include the channels 52, the sector plates 84, and the skid 44 and their cooperating parts as already described. The space between the plates 84 and 26 is closed at the forward side by arcuate baffle plates 89 welded to the inside of the side plates 26. This upward movement of the pivoted assembly is accomplished by the action of a pair of counter weights 90, which hang by cables 92 from pulleys 94 attached to the forward uprights 18 slightly below the upper side members 24 in any convenient manner as, for example, by being fastened to welded plates 96. The free end of the cables 92 are attached to the outwardly projecting portions of the transverse bar 88, and the counterweights urge the pivoted assembly upwardly until stopped by contact between the ends of the bar 88 and the apex 28 in the cutout of the side plates 26 (Fig. III).

The counterweights 90 are of such weight to move an unloaded pivoted assembly and will be overbalanced by the load carried by the full totebox T so as to move downwardly until the bar 88 contacts the rear frame members 16 as shown in Fig. IV, a spring-actuated catch 98 being provided to lock with the ends of the bar 88 to hold the pivoted assembly in "down" position.

With the pivoted assembly in "down" position, there is a change of about 30 degrees of rotation in a clockwise direction (Figs. III and IV) about the pivot pins 62 of the pivoted assembly which allows the floor 45 of the totebox T to rotate substantially the same amount while maintaining its cooperative relation with the superimposed rings 38 adjacent the pivot pins 62 or its rear end. The front end of the floor drops, thereby forming a ramp down which the loose material contained in the totebox will move under the influence of gravity to be caught in a hopper device H which is preferably a subassembly bolted to the front uprights 18, so that it may be removed and the hopper device with various arrangements may be substituted, which makes for flexibility in use in a production line. Between the hopper device H and the inclined ramp formed by the floor 45 of the skid 44 a bypass gate G is provided which will now be described.

The gate G comprises generally of an adjustable ramp, which normally is a continuation of the ramp formed by the inclined floor of the totebox when the pivoted assembly is in down position, between the floor and the hopper H. Under these circumstances, the gate G is positioned in about the same angular relation, so that the material from the totebox T flows over it into the hopper H.

The gate G consists of a plate 100 of relatively narrow transverse dimension, extending longitudinally between the forward pair of uprights 18. At each end, the plate is provided with transverse angles 102 welded thereto, which strengthens the plate and also forms a convenient member to pivot the plate to the upright members 18. For this purpose, pins 104 are provided which are fitted into aligning apertures in the forward end of the angles 102 and in the uprights 18. At the rearward end of the angles 102, threaded studs 106 are welded in position to extend through arcuate slots 108 in the side plates 26, the slots extending slightly over 45 degrees with reference to the pivotal pins 104 which form the center of rotation for the plates. Lock nuts are provided to cooperate with the threaded studs 106 so as to lock the plate 100 in position by locking against the plate 26. With the studs 106 in the upper ends of the arcuate slots 108, the plate 100 is a continuation of the ramp formed by the inclined floor 45 of the totebox T, so that material flowing therefrom will be transferred to the hopper H and made available to an operator of a machine tool. This is shown schematically in Fig. VI.

With the studs 106 in the lower ends of the arcuate slots 108, the plate 100 is moved to a somewhat transverse position with reference to the inclined ramp formed by the inclined floor 45 of the totebox, and will bypass the material flowing down from the totebox into another empty totebox located on the floor between the base members 14, being positioned from the rear of the device, substantially as shown schematically in Fig. VII.

The bypassing of the material in the totebox to an empty totebox is often desirable in the event a mistake was made in loading the wrong material on the frame, or, should it be desirable to empty the device to supply another different type of material.

Returning now to the hopper H, which is bolted to the forward side of the uprights 18, it comprises an upper portion, which includes a pivoted door member 110, and a lower reversible apron 112, which can be bolted to the upper portion in diametrically-reversed position from that shown in the drawings to make the opening available from the opposite side, which is often desirable for the convenience of the operator. As shown in Fig. I, the operator whose foot prints F are shown, removes material from the apron 112 with his left hand and utilizes such material in connection with a machine tool M immediately before him. Should the machine tool M have its operative position on its opposite side, the operator would remove the material with his right hand and the apron 112 would be reversed to extend from the opposite side of the frame 12.

The upper portion is bolted to the uprights 18 by a pair of vertical angle irons 114, one for each upright, to which are welded a pair of side plates 116 of triangular conformation, the sloping portion of these plates being strengthened by a smaller pair of angle irons 118 being welded thereto. Adjacent the top, a transverse angle iron 120 is welded to the assembly to hold the elements in spaced relation for bolting to the frame members 18, inasmuch as the whole is constructed as a self-sustaining subassembly adapted to be bolted as a unit to the frame. Attached to the lower edge of the iron 120, a hinge element 121 is provided to pivot the door member 110, already described, which is fitted between the side plates 116 for adjustable movement between the angle iron 118 and the vertical angle irons 114 and a front closure plate 122.

A handle 110A is provided on the door 110 for convenient manual manipulation, and a pair of threaded studs 123 are welded to its lateral edges to extend through arcuate slots 124 formed in the side members 116 having their centers in the hinge 121. On the outwardly extending threaded portions of the studs 123, lock nuts are provided to hold the door in fixed relation in the selected angular position which is determined by the characteristics of the material carried by the totebox positioned on the frame. It is the purpose of the door 110, to cooperate with the gate G to form a constricted opening therebetween, so that the flow of material down the ramp into the hopper H can be, in some measure, controlled, whereby an operator can easily remove loose parts from the apron 112 without hindrance from the pressure of a large number of parts positioned above, as would be the case if the full contents of the totebox were allowed to flow into the apron 112. The pressure of the large numbers of parts tends to lock the individual elements together in a heap so that they are hard to remove by an operator one by one. The door 110 allows only a limited number of parts to fall into the apron, so that the parts are in loose relation without pressure from the parts still on the ramps.

As has been pointed out before, the apron 112 is reversible on the hopper H to extend in a diametrically opposed direction, should the convenience of the operator or circumstances so dictate. The side pieces 116 are provided at their bottom edges with angle irons 126 to which is attached the apron 112 by bolts 128. The side plates 130, which are cut in tapering form to provide a slope for the bottom 132 toward the opening, are attached by lugs 134, which cooperate with the side plates 130 by bolts 136 to the hopper H. By manipulation of the bolts 128 and 136, the apron can readily be reversed, as already described.

In use, in connection with a machine tool, the material handling apparatus hereinbefore described, operates substantially as follows: With the device in unloaded, empty position shown in Fig. III, where the counterweights 90 are holding the pivoted assembly in its uppermost position with the bar 88 cooperating with the apex 28 in the side plates 26, a lift truck, by its prongs 50 (Fig. V) enters the free space below the floor 45 of a skid on which are positioned one or more rings 38 loaded with the loose material which is to be further fabricated by the machine tool, and lift the totebox T with its load upwardly until the runners 46 of the totebox assembly are aligned with the flared openings 56 of the channels 52 with the transverse shaft 78 removed from the slots 76. The totebox is then moved forward by the lift truck, so that the runners are positioned in the channels 52, and the front end of the totebox assembly is in contact with the angle irons 30 and 32 on the frontward uprights 18, at which time the assembly is slowly lowered into position, so that the weight is removed from the prongs 50 and placed on the frame work. The transverse shaft 78 is then replaced in its layout slots 76 and rotated until the totebox is locked in position against the angle irons 30 and 32, with the bar 40 in contact with the lower side of the lip 36 of the lowermost ring 38 of the totebox. The lift truck is then slowly backed away with its prongs 50 slightly below the level of the floor 45, which allows the pivoted assembly to slowly rotate about the pivot pins 62 to lower the front end of the floor 45 away from its cooperative relation with the lower ring 38 of the totebox assembly against the action of the counterweights 90. The rings 38 will be retained in substantially their original position by the bar 40 which holds them firmly in horizontal position.

As the lift truck continues to move away, the pivoted assembly, including the skid 44, takes the final position shown substantially in Fig. IV, where the assembly may be locked in "down" position by the catch 98. The pivoted assembly will remain in this position until the catch 98 is released by the operator. It is to be noted that the load in the totebox creates the movement of the pivoted assembly against the action of the counterweights 90, and, when such load is removed by use, the counterweights are of sufficient weight to return the pivoted assembly to normal horizontal position.

The pivoted assembly in "down" position allows the loose parts loaded into the totebox to flow down the inclined floor 45 which forms a ramp (Fig. VI) over the bypass gate G which normally forms a continuation of the floor 45, past the constriction caused by the adjustable door member 110 into the apron 112, where it flows down the inclined floor 132 into the opening where the operator picks the loose parts up, one by one, and feeds them to the machine tool.

Should a mistake be made, and a totebox unloaded into the device containing unsuitable loose parts, the bypass gate G is utilized to unload the machine as already described and shown schematically in Fig. VII.

When a new load of parts is to be placed in the device with the floor 45 clear, the catch 98 is released, which allows the counterweight to move the pivoted assembly to horizontal position again where the lift truck is again used to remove the empty totebox from the frame-work. A full totebox is then again positioned on the frame-work in the manner already described.

In Figs. VIII, IX, and X, a simpler modification of the device described hereinbefore is disclosed, which, however, does not have the flexibility of the more complex modification. Here the bypass gate G is dispensed with, as is the pivoted door member 110. The apron 150 in this modification opens forwardly, which can also be readily attained in the first modification with changes easily made by a man skilled in the art. In other respects, the principles of operation are retained in this modification, such as the pivoted assembly 152, the ring-holding means 154, and the rear transverse locking bar 156. With an understanding of the operation of the first modification, the operation of this simpler modification is apparent.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a material handling apparatus for use with a totebox having a removable skid bottom with runners and a ring-like side member, a supporting frame-work, an open-sided hopper means on said frame-work located at a convenient work height, a pivoted frame attached to the frame-work a substantial distance above the hopper means to form a mounting for the runners of the skid bottom of the totebox adapted to be positioned on the frame, and holding means on the frame-work to grip the ring-like side member of the totebox to maintain a substantially horizontal position, whereby the pivoted frame allows the removable skid bottom to move about the pivot to form a ramp to empty the contents of the totebox into the hopper means for the convenience of an operator.

2. In a material handling apparatus for use with a totebox having a removable skid bottom with runners wherein partially-fabricated parts are made conveniently available to an operator of a machine tool, a supporting frame-work, open-sided hopper means on the frame-work at a convenient work location for the operator to hold the parts to be handled, means on the frame-work to grip the sides of the totebox to hold them in position thereon, a pivoted frame on the frame-work for mounting the runners on the skid forming the removable bottom of the totebox, said pivotal frame being movable downwardly in relation to the means to grip the sides of the totebox, allowing the removable bottom of the tote box to drop on one end to form a ramp inclined toward the hopper means to remove the parts from the totebox to the hopper means to make them available to the operator.

3. The combination defined in claim 2 further characterized by having a pivoted member intermediate the ramp formed by the inclined bottom of the totebox and the hopper means, which is capable of being pivoted downwardly to form a secondary ramp substantially transverse to bypass the material in the totebox into another container.

4. The combination defined in claim 2 further characterized by a barrier positioned above the hopper means and the end of the ramp to control the opening through which parts can fall into the hopper means.

5. The combination defined in claim 4 further characterized by having the barrier pivoted so as to be adjustable to the material being supplied and the needs of the operator.

6. In a material handling apparatus, a material container with removable bottom, frame means to hold the container at an elevated position, an apron on the frame means positioned below the container, pivot means on the frame means entirely separated from the container but cooperating therewith to lower one side of the removable bottom to form a ramp whereby the material in the container flows by gravity onto the apron, and an adjustable member positioned on the frame means, intermediate the apron and the lower side of the tilted bottom, which normally forms a continuation of the ramp formed by the tilted bottom, which is adapted to be adjusted to a position transversely of the ramp to bypass the material in the container to a lower level in the event it is desirable to remove the material from the container before it reaches the apron.

7. In a material handling apparatus, a material container with a removable bottom, frame means to hold the container at an elevated position, an apron on the frame means positioned below the container, pivot means on the frame means entirely separated from the container but cooperating therewith to lower one side of the removable bottom to form a ramp whereby the material in the container flows by gravity onto the apron, and an adjustable hinged gate cooperating with the lower end of the removable bottom which is adapted to constrict the flow of material down the ramp onto the apron.

8. In a material handling apparatus, a material container with a removable bottom, frame means to hold the container at an elevated position, an apron on the frame means positioned below the container, pivot means on the frame means entirely separated from the container but cooperating therewith to lower one side of the removable bottom to form a ramp whereby the material in the container flows by gravity onto the apron, and locking means on the frame means cooperating with the pivot means and the container to assure holding a portion of the container firmly in substantially horizontal position on the frame means, while the pivot means lowers one side of the removable bottom of the container to form the ramp.

9. In a material handling apparatus, a material container with a removable bottom, frame means to hold the container at an elevated position, an apron on the frame means positioned below the container, pivot means on the frame means entirely separated from the container but cooperating therewith to lower one side of the removable bottom to form a ramp whereby the material in the container flows by gravity onto the apron, and a locking and clamping means on the frame means functioning against the side of the container to restrain movement of the container from a horizontal position on the frame means.

10. In a device of the class described, a supporting framework, an apron positioned on the frame-work at a convenient work height, a pivoted frame positioned above the apron and adapted to cooperate with a totebox having a separable bottom, holding means on the frame-work adapted to cooperate with a side portion of the totebox to hold the totebox in substantially horizontal position, the parts being adapted to lower one side of the separable bottom of the totebox to form an inclined ramp between the apron and the elevated horizontally-positioned side portion of the totebox, and a pivoted member intermediate the ramp and the apron, which is capable of being pivoted downwardly to form a secondary ramp substantially transverse to the ramp formed between the apron and the elevated horizontally-positioned side portion of the totebox.

11. In a device of the class described, a supporting frame-work, an apron adjustably positioned on the forward side of the frame-work at a convenient work height, a movable frame on the frame-work positioned a substantial distance above the apron and adapted to cooperate with a totebox having a separable bottom provided with runners, said runners being adapted to rest on said movable frame, a pivot for the movable frame-work positioned at the rear side of the frame-work whereby the movable frame may have its forward side lowered to a cooperable position with the apron, holding means on the frame-work adapted to cooperate with a side portion of the totebox to hold it in substantially horizontal position, the parts being adapted to lower the forward side of the separable bottom of the totebox to form an upwardly inclined ramp between the apron and the elevated horizontally-positioned side portion of the totebox, and a pivoted member intermediate the ramp formed by the inclined bottom of the totebox and the apron, which is capable of being pivoted downwardly to form a secondary ramp, substantially transverse to the ramp formed between the apron and the elevated horizontally-positioned side portion of the totebox.

12. In a material handling apparatus, a multipart material container including a removable skid bottom, frame means including a pivotal member cooperating with the skid bottom to hold the container at an elevated position, an apron on the frame means positioned below the container, an adjustable member adjacent the apron adapted to direct the flow of material from the container either into or away from the apron, and means on the frame means cooperating with a portion of the container and the pivotal member whereby the side of the removable bottom adjacent the apron is lowered to form a ramp whereby the material in the container flows by gravity onto the apron.

13. In a device of the class described, a supporting frame-work, an apron positioned on the frame-work at a convenient work height, a movable frame pivoted on the frame-work on the side opposite from and above the apron and adapted to cooperate with the separable bottom of a multipart totebox, holding means on the frame-work adapted to cooperate with a side portion of the totebox to hold that portion of the totebox in substantially horizontal position, and an adjustable member on the frame-work adapted to be positioned to direct the flow of material from the tote box either into or away from the apron, the parts being adapted to lower the side of the separable bottom of the totebox adjacent the apron to form an inclined ramp between the apron and the elevated horizontally-positioned side portion of the totebox.

14. The device defined in claim 6 further characterized by an adjustable hinged gate cooperating with the adjustable by-pass member between the tilted bottom of the container and the apron which is adapted to constrict the flow of material down the ramp onto the apron, the by-pass member being adapted to be adjusted to a transverse position to by pass the material in front of the hinged gate to a lower level if desired.

15. The combination set forth in claim 10 further characterized by having a pivoted barrier capable of being adjusted cooperating with the end of the ramp immediately above the apron.

16. The combination set forth in claim 11 further characterized by having a pivoted barrier capable of being adjusted cooperating with the end of the ramp immediately above the apron.

References Cited in the file of this patent

UNITED STATES PATENTS

| | | |
|---|---|---|
| 284,835 | Gibbs | Sept. 11, 1883 |
| 314,552 | Wilson | Mar. 24, 1885 |
| 596,133 | Appleton | Dec. 28, 1897 |

(Other references on following page)

UNITED STATES PATENTS

| Number | Name | Date |
|---|---|---|
| 623,775 | Fey | Apr. 25, 1899 |
| 1,232,119 | Summers | July 3, 1917 |
| 1,351,251 | Jewell | Aug. 31, 1920 |
| 1,456,353 | Bare | May 22, 1923 |
| 1,457,038 | Lane et al. | May 29, 1923 |
| 1,619,784 | Counts | Mar. 1, 1927 |
| 1,682,958 | Geddes | Sept. 4, 1928 |
| 1,787,835 | On | Jan. 6, 1931 |
| 2,323,233 | Miller | June 29, 1943 |
| 2,440,056 | McIntyre et al. | Apr. 20, 1948 |
| 2,447,409 | Gulow | Aug. 17, 1948 |

OTHER REFERENCES

Monroe Equipment Company Catalog Sheet and Price List issued December 19, 1947.

Powell Material Handling Equipment Bulletin No. 600, Stamped February 20, 1948.